United States Patent
Babu et al.

(10) Patent No.: US 9,584,426 B2
(45) Date of Patent: Feb. 28, 2017

(54) CONGESTION MANAGEMENT IN OVERLAY NETWORKS

(71) Applicant: Broadcom Corporation, Irvine, CA (US)

(72) Inventors: Biju Ravindranatha Babu, San Jose, CA (US); Puneet Agarwal, Cupertino, CA (US); Mohan Venkatachar Kalkunte, Saratoga, CA (US)

(73) Assignee: BROADCOM CORPORATION, Irvine, CA (US)

( * ) Notice: Subject to any disclaimer, the term of this patent is extended or adjusted under 35 U.S.C. 154(b) by 331 days.

(21) Appl. No.: 14/246,889

(22) Filed: Apr. 7, 2014

(65) Prior Publication Data

US 2014/0310362 A1 Oct. 16, 2014

Related U.S. Application Data

(60) Provisional application No. 61/811,051, filed on Apr. 11, 2013.

(51) Int. Cl.
*H04L 12/801* (2013.01)
(52) U.S. Cl.
CPC .................... *H04L 47/33* (2013.01)
(58) Field of Classification Search
CPC ...................................... H04L 47/33
See application file for complete search history.

(56) References Cited

U.S. PATENT DOCUMENTS

| | | | | |
|---|---|---|---|---|
| 6,009,326 A * | 12/1999 | Roder | ................ | H04W 92/02 455/436 |
| 6,804,247 B1 * | 10/2004 | Sasyan | ................ | H04L 12/4608 370/395.6 |
| 7,546,354 B1 * | 6/2009 | Fan | ................ | G06F 11/2025 709/219 |
| 7,978,607 B1 * | 7/2011 | Halabi | ................ | H04L 47/263 370/229 |
| 2003/0076814 A1 * | 4/2003 | Gurivireddy | ........ | H04W 68/00 370/352 |
| 2013/0322252 A1 * | 12/2013 | DeCusatis | ............ | H04L 47/33 370/236 |

* cited by examiner

*Primary Examiner* — Michael C Lai
(74) *Attorney, Agent, or Firm* — Oblon, McClelland, Maier & Neustadt, L.L.P.

(57) ABSTRACT

A system forwards congestion management messages to a source host updating the source address in the management message. The system may determine that the congestion management message was triggered responsive to an initial communication that was previously forwarded by the system. The system may use header translation within a single addressing scheme and/or may translate the congestion management message into a different type to support forwarding to the source of the initial communication. The system may use portions of the payload of the congestion management message to determine the source of the initial communication and to derive a different header for the translated congestion management message.

20 Claims, 18 Drawing Sheets

CONGESTION MANAGEMENT IN OVERLAY NETWORKS

CROSS REFERENCE TO RELATED APPLICATIONS

This application claims priority to provisional application Ser. No. 61/811,051, filed 11 Apr. 2013, which is incorporated by reference in its entirety.

TECHNICAL FIELD

This disclosure relates to congestion message handling in networks. This disclosure also relates to translating congestion messages to support handling.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in packet handling, including improvements in path resolution, will further enhance performance of data networks.

DETAILED DESCRIPTION

The disclosure below concerns techniques and architectures for forwarding management messages, such as congestion management messages, to a source host across multiple addressing regions in a network. The addressing regions may use differing address types to support message handling. For example, a first region may use internet protocol (IP) addresses for packet routing. A second region may use media access control (MAC) address in a network bridge regime. In some cases, multiple regions may use the same addressing scheme, but the source host address may not be available for listing in a top level header. For example, an overlay such as an IP tunnel may be used in the network. Address translation within a single addressing scheme may be used to forward the management message to the source host. For example, a management message arriving at a router at a node of an overlay may be translated and re-addressed by the router for forwarding to the source host behind the router. In various implementations, combinations of multiple addressing scheme translation and single addressing scheme translation may be used to forward a management message from the point of management to the source host of the communication that triggered the management message.

Figure 1:
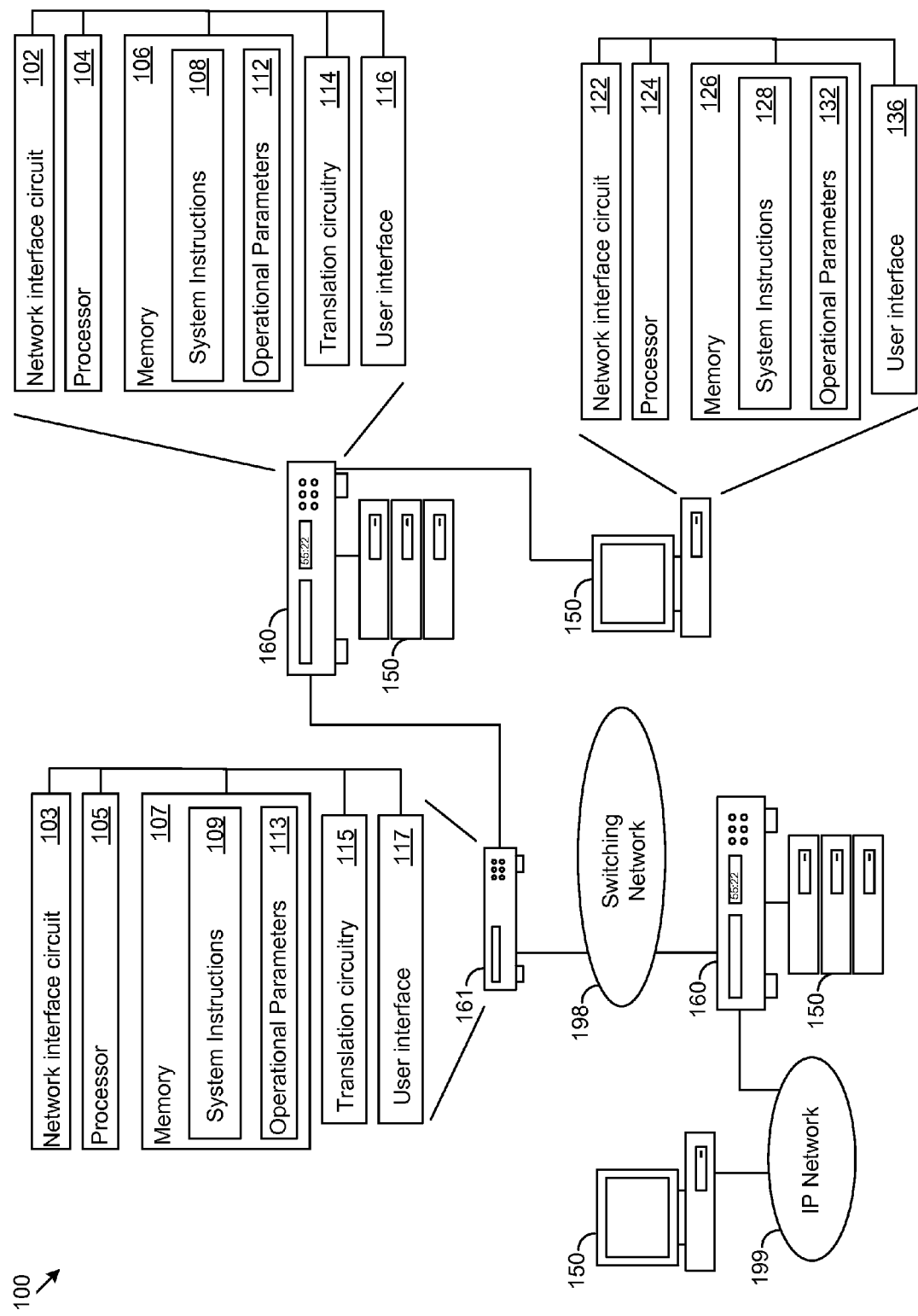
FIG. 1 shows an example network environment.

The example device described below provides an example context for explaining the techniques and architectures for congestion handling in overlay networks. FIG. 1 shows an example network 100 environment. Hosts 150, such as servers, smartphones, and/or other devices, may be interconnected over the network 100. The hosts 150 may act as destination and/or source hosts as communications are sent across the network 100. The routers 160 and bridges 161 may handle bridging and traffic forwarding in the network 100. The network 100 may include connectivity over IP networks 199 and/or switching networks 198. In some cases, the network 100 may send communications over the internet and/or third party networks to forward communications from a source host to a destination host.

The routers 160 and bridges 161 may include the functionality of network switches, routers, bridges, servers, and/or other network infrastructure devices. The routers 160 may use a first addressing scheme such as IP addressing. The bridges 161 may use a second addressing scheme such as MAC addressing. In some cases, the network 100 may be broken into regions using different types of addressing. For example, a first region may include a level 3 (L3) network and/or network overlay, and a second region may include a level 2 (L2) network and/or network overlay. Circuitry included in the routers 160 may include a network interface circuit 102 to support network communications over one or more protocols, and one or more processors 104 to support execution of applications, routing operations, traffic forwarding and operating systems, and to govern operation of the router 160. The router 160 may include memory 106 for execution support and storage of system instructions 108 and operational parameters 112. The router 160 may include a user interface 116 to allow for user configuration and operation of the router 160. The routers 160 may further include translation circuitry 114 to support message forwarding to source hosts. As discussed below, the translation circuitry may be configured to identify management messages triggered by locally originating communications.

In various implementations, circuitry included in the bridges 161 may include a network interface circuit 103 to support network communications over one or more protocols, and one or more processors 105 to support execution of applications, routing operations, traffic forwarding and operating systems, and to govern operation of the bridge 161. The bridge 161 may include memory 107 for execution support and storage of system instructions 109 and operational parameters 113. The bridge 161 may include a user interface 117 to allow for user configuration and operation of the bridge 161. The bridges 161 may further include translation circuitry 115 to support message forwarding to source hosts. As discussed below, the translation circuitry may be configured to identify management messages triggered by locally originating communications. In some implementations, translation of management messages may be handled by routers 160. Bridges 161 may forward management messages to a "next-hop" router and may perform no translation. Various ones of the above elements may be omitted to support simplified bridge design.

The hosts 150 may include servers, terminals, and/or other computing devices. Circuitry included in the hosts 150 may include a network interface circuit 122 to support network communications over one or more protocols, and one or more processors 124 to support execution of applications and operating systems, and to govern operation of the host 150. The host 150 may include memory 126 for execution support and storage of system instructions 128 and operational parameters 132. The host 150 may include a user interface 136 to allow for user operation of the host.

Figure 2:
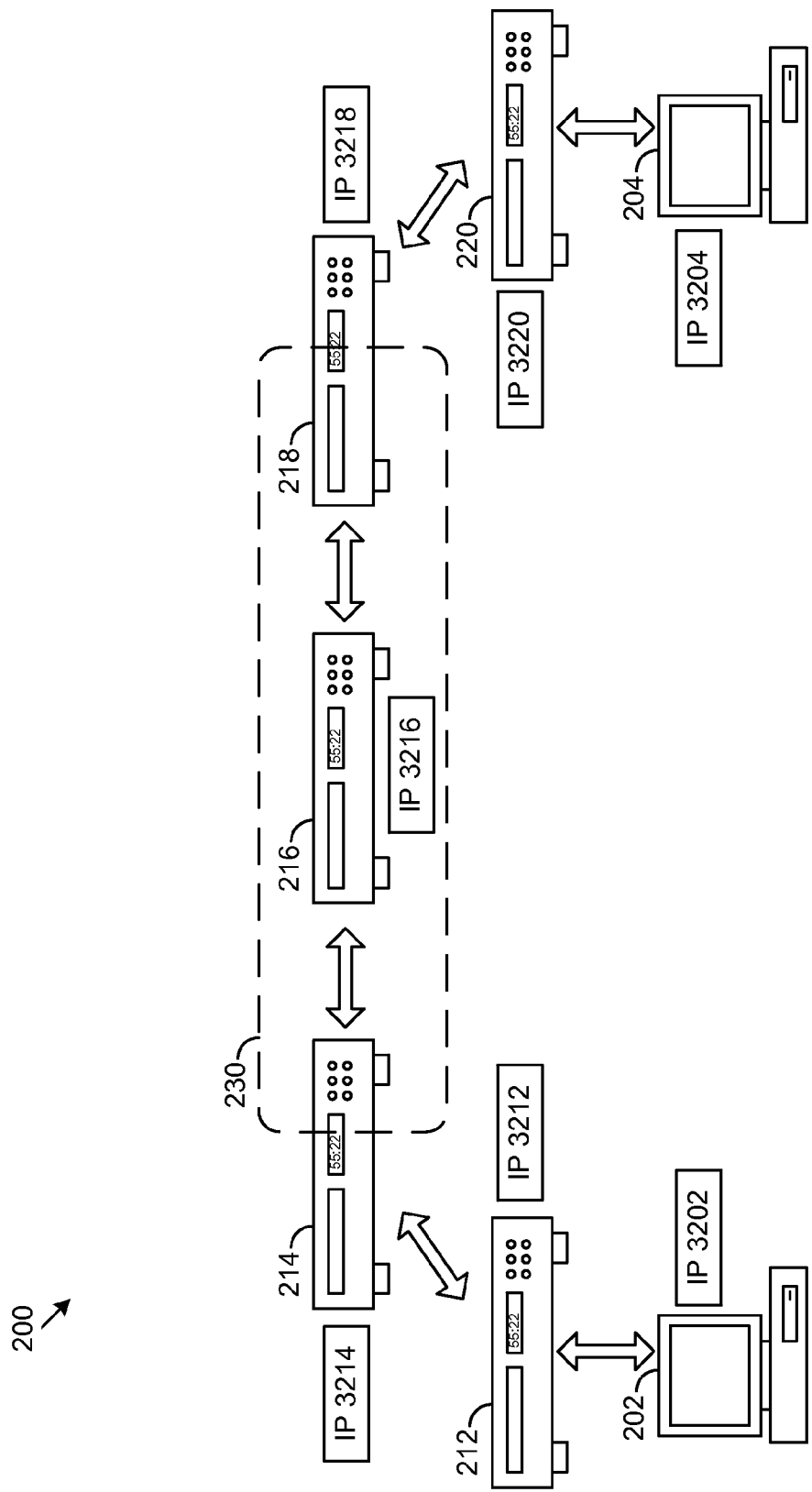
FIG. 2 shows an example network environment.

FIG. 2 shows an example network environment 200. In the example network environment 200, a source host 202 may send communications to a destination host 204. The communications may traverse routers 212, 214, 216, 218, and 220. Router 214 may be the ingress node to network overlay 230, and router 218 may be the egress node of network overlay 230. Network overlay 230 may traverse router 216. In various implementations, network overlay 230 may include an IP-tunnel, network address translation (NAT) device, or firewall, and routers 212, 214, 216, 218, and 220 may forward communications using an IP-addressing in a L3 network system. The hosts 202 and 204 may respectively have IP-addresses 3202 and 3204. Routers 212, 214, 216, 218 and 220 may have IP-addresses 3212, 3214, 3216, 3218, and 3220, respectively.

In some implementations, during periods of congestion, such as periods of elevated traffic levels, near capacity routing activity, or other congestion periods, the routers 212, 214, 216, 218, and/or 220 may generate congestion management messages, such as, congestion notification messages (CNM), and/or other congestion management messages. Congestion handling may be implemented using a quantized congestion notification (QCN) based infrastructure.

In some cases, a communication originating from source host 202 may trigger a congestion management message at one or more of the routers 212, 214, 216, 218, and 220 as the communication is routed to destination host 204. Routers 212, 214 may be within the same addressing region as the source host. Communications from the source host within this addressing region may include the source host IP-address 3202 as the source IP of the communication. Congestion management messages, such as CNMs, triggered at routers 212 and/or 214 may place the source host IP 3202 from the source IP of the communication into the destination address of the triggered congestion management message and the congestion management message may be forwarded back to the source host 202.

At routers beyond router 214, the ingress node of network overlay 230, (routers 216, 218, 220) communications from source host 202 may include the IP address 3214 of the ingress node, router 214. In some cases, a communication originating from source host 202 may trigger a congestion management message that is directed to router 214. In some cases, it may be advantageous for triggered congestion management message to be forwarded back to the host that originated the triggering communication—in this example, source host 202.

In various implementations, router 214 may translate a congestion management message with IP 3214 listed as the source IP into a congestion management message with IP 3202 listed as the source IP. For example, if a L3 CNM is triggered at routers 216, 218, and/or 220 by a communication from the source host 202, the L3 CNM may be forwarded to router 214 at IP 3214. Router 214 may translate the first L3 CNM addressed to IP 3214 into a different L3 CNM addressed to IP 3202.

Figure 3:
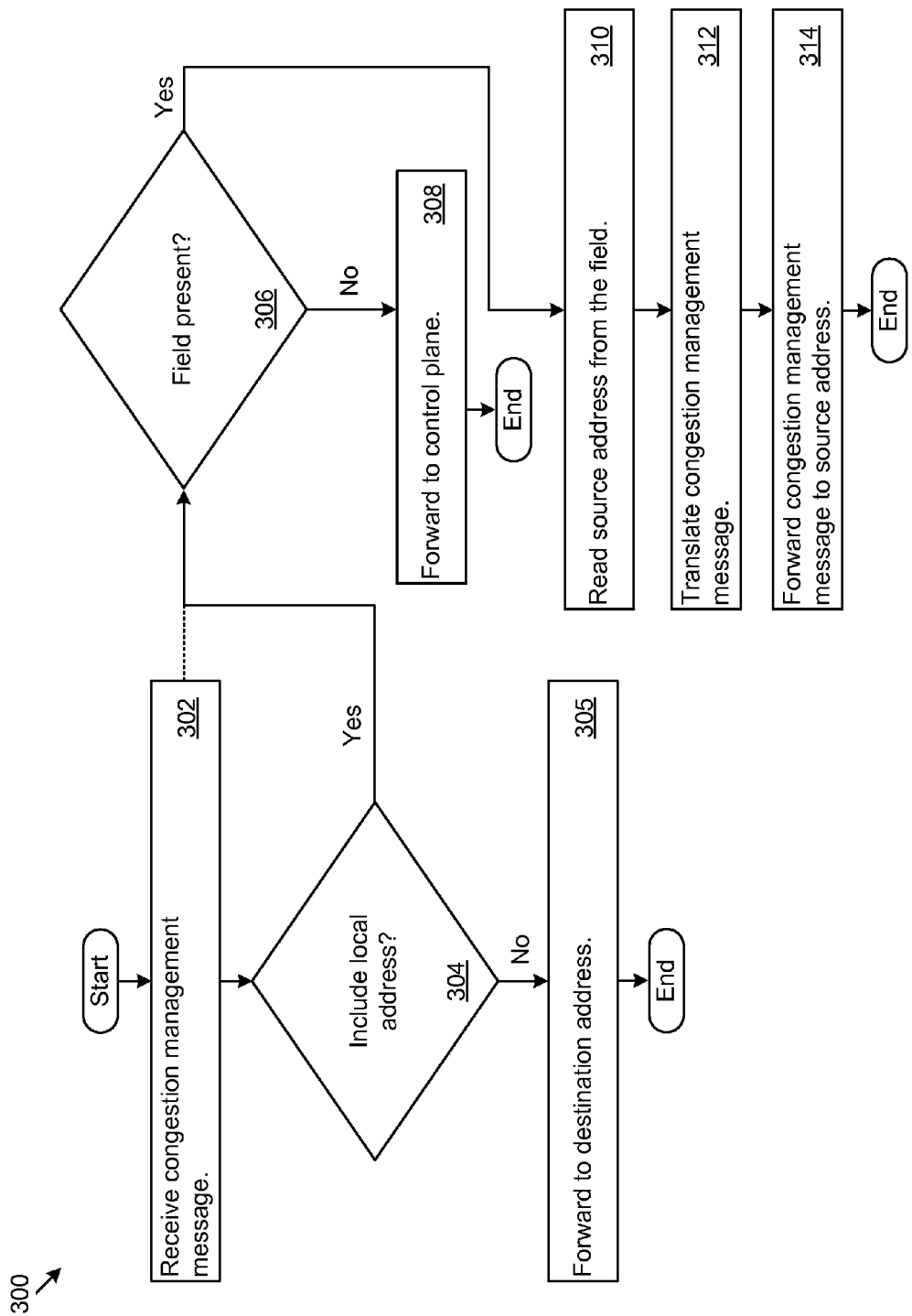
FIG. 3 shows example translation circuitry for congestion management message translation.

FIG. 3 shows example translation circuitry 300 for congestion management message translation. The example translation circuitry 300 may handle an incoming congestion management message which includes the receiving routers address. The translation circuitry 300 may receive the congestion management message (302). For example, the congestion management message may be received at a network interface circuit of a router including translation circuitry 300. The congestion management message may be passed to the translation circuitry from the network interface circuit. In various implementations, the translation circuitry 300 may determine if the congestion management message includes the local address of the router (304). If the congestion management message has the local address for the translation circuitry 300, the congestion management message was triggered by a communication originating from the router including the translation circuitry 300 or a network overlay for which the router is the ingress node. If the congestion management message, does not include the local address, the translation circuitry 300 may have the message forwarded on to its destination address (305). In various implementations, a congestion management message without a local IP address may be forwarded to its destination IP without first providing the congestion management message to the translation circuitry 300.

The translation circuitry 300 may determine if a field associated with a network overlay or other network address translation is present in the payload of the congestion management message (306). For example, the field may be a header associated with a network overlay for which the router of the translation circuitry is the ingress node. The overlay header may be present in the payload of the congestion management message if the congestion management message was triggered by a communication that traversed a portion of the network overlay. In various implementations, the field may be present in situations in which a communication traverses a boundary between addressing regions. For example, the header may be present for a communication crossing from an MAC addressing region into an IP addressing region. If the field is not present, the congestion management message may have been triggered by a communication originating from the router including the translation circuitry. In response, the translation circuitry 300 may forward the congestion management message to the control plane of the router (308). If the field is present, the translation circuitry 300 may read a source address from the field (310). The translation circuitry 300 may then translate the congestion management message into a translated congestion management message with the source address from the field as the destination address (312). In some cases, the translated congestion management message may be the same type as the original congestion management message. For example, the original and translated congestion management messages may be two L3 CNMs or two L2 CNMs. In various cases, the translated and original congestion messages may be of different types. For example, the original and translated congestion management messages may include one L3 CNM and one L2 CNM. The translation circuitry 300 may then forward the translated congestion message (314).

Figure 4:
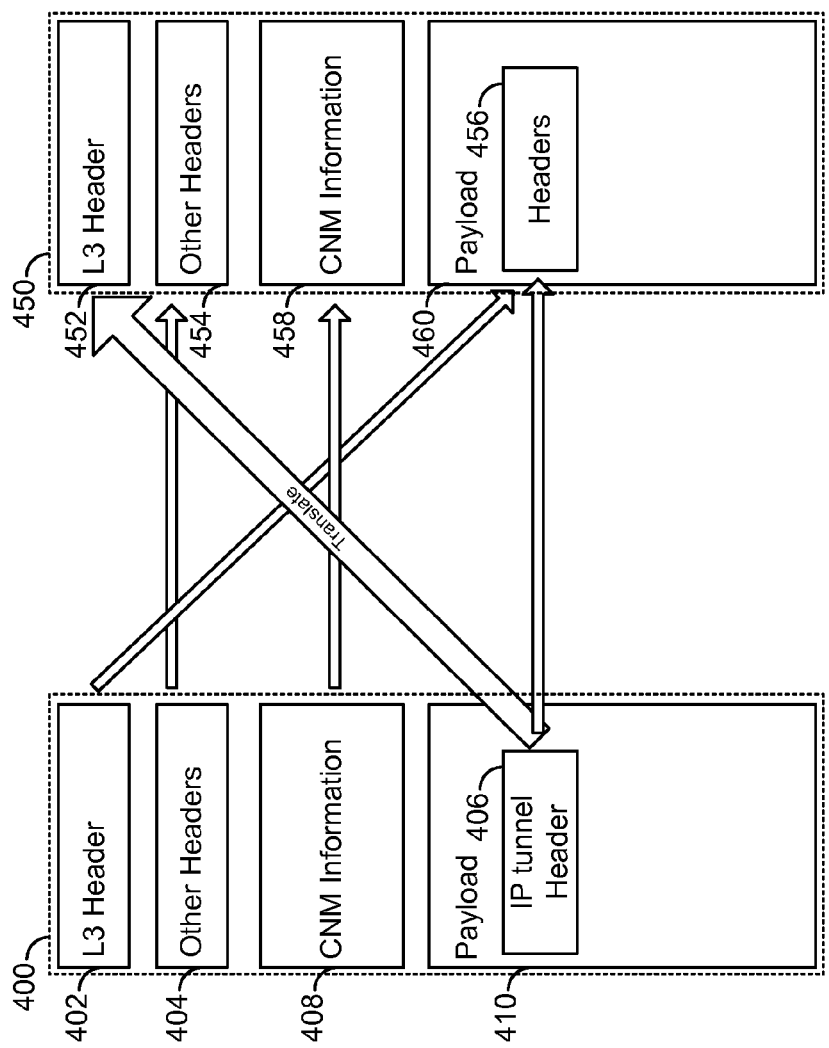
FIG. 4 shows an example translation from an Level 3 (L3) congestion notification message (CNM) to a translated L3 CNM.

In an example, the network overlay 230 may include an IP tunnel in a L3 network. The translation circuitry 300 may translate a L3 CNM into a translated L3 CNM for forwarding beyond the ingress node of the IP tunnel. FIG. 4 shows an example translation from an L3 CNM 400 to a translated L3 CNM 450. The L3 IP tunnel header 406 with the source IP is translated into the L3 main IP header 452 of the translated L3 CNM. The L3 main IP header 402 of the original L3 CNM may be dropped or added to the payload 460 of the translated L3 CNM. Other header fields 404, for example, L2 headers, secondary headers, and/or other headers, from the original L3 CNM may be translated into header fields 454 on the translated L3 CNM. The payload 410 of the original L3 CNM may be translated to the payload 460 of the translated L3 CNM. The CNM information 408 of the original L3 CNM may be translated to the CNM information 458 of the translated L3 CNM.

Figure 5:
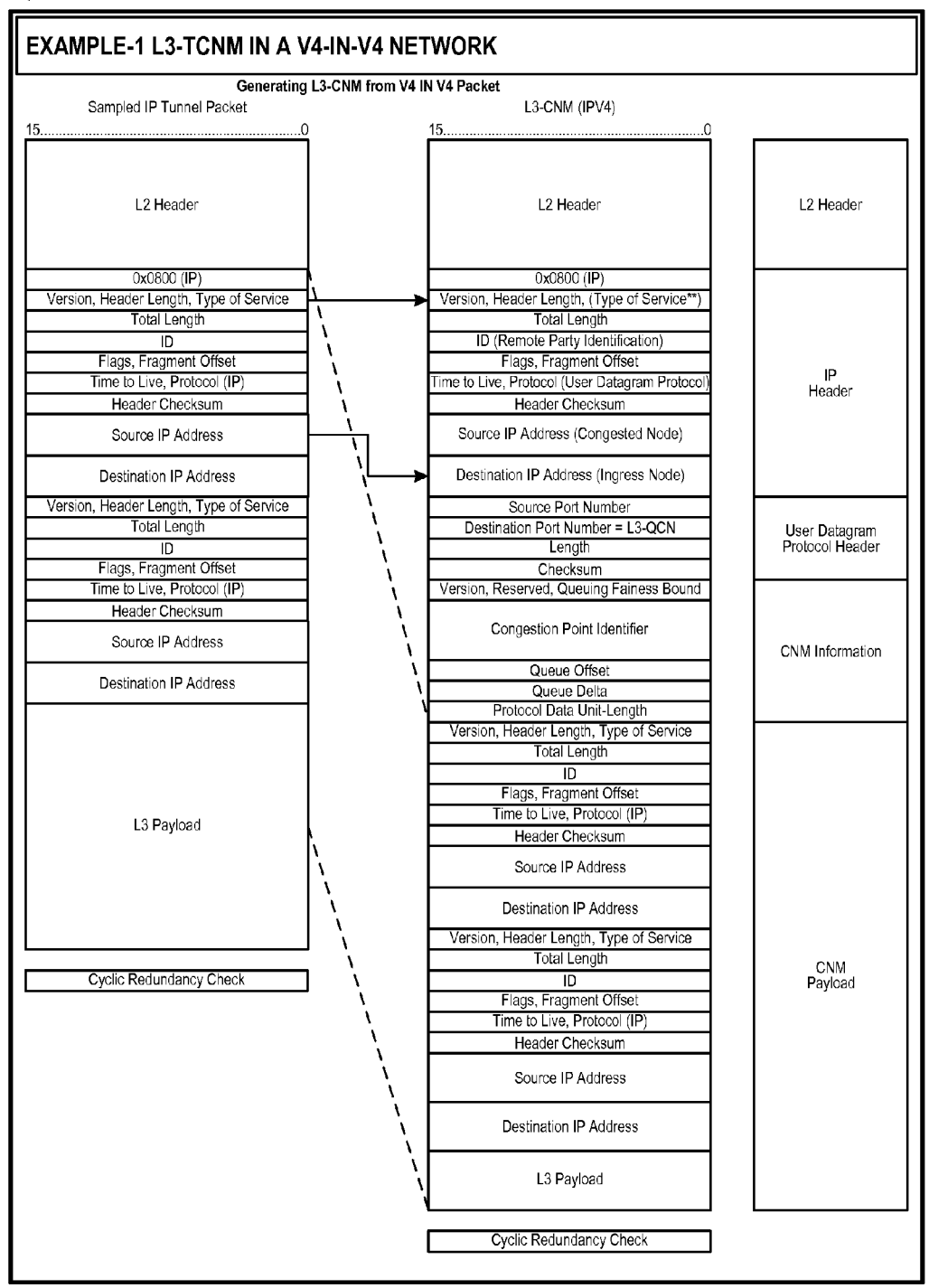
FIG. 5 shows an example generation of an internet protocol (IP) version 4 (IPv4) L3 CNM from an IPv4 packet.

FIG. 5 shows an example generation 500 of an IP version 4 (IPv4) L3 CNM from an IPv4 packet.

Figure 6:
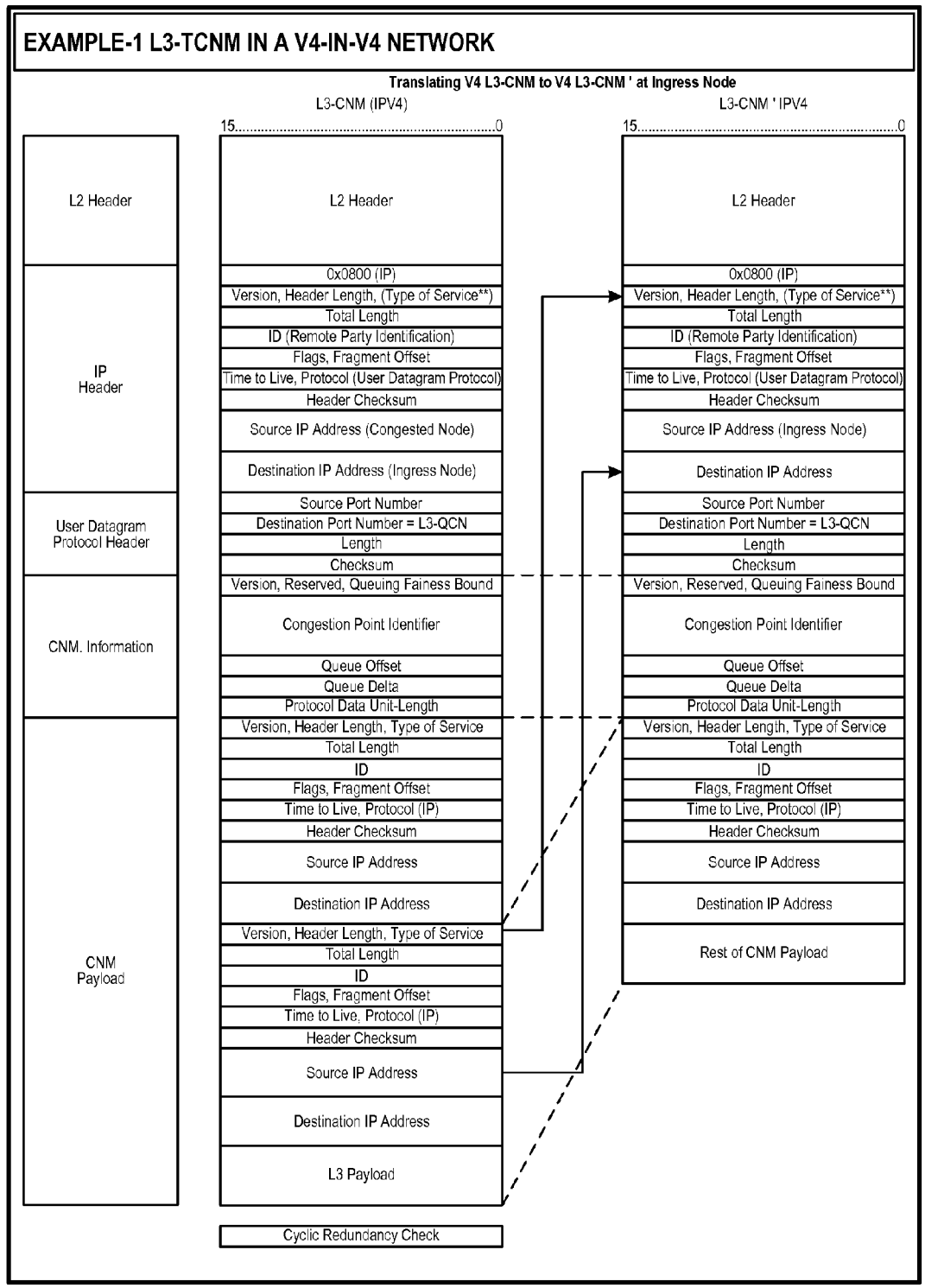
FIG. 6 shows an example translation of an IPv4 L3 CNM to an IPv4 L3 CNM.

FIG. 6 shows an example translation 550 of an IPv4 L3 CNM to an IPv4 L3 CNM.

Figure 7:
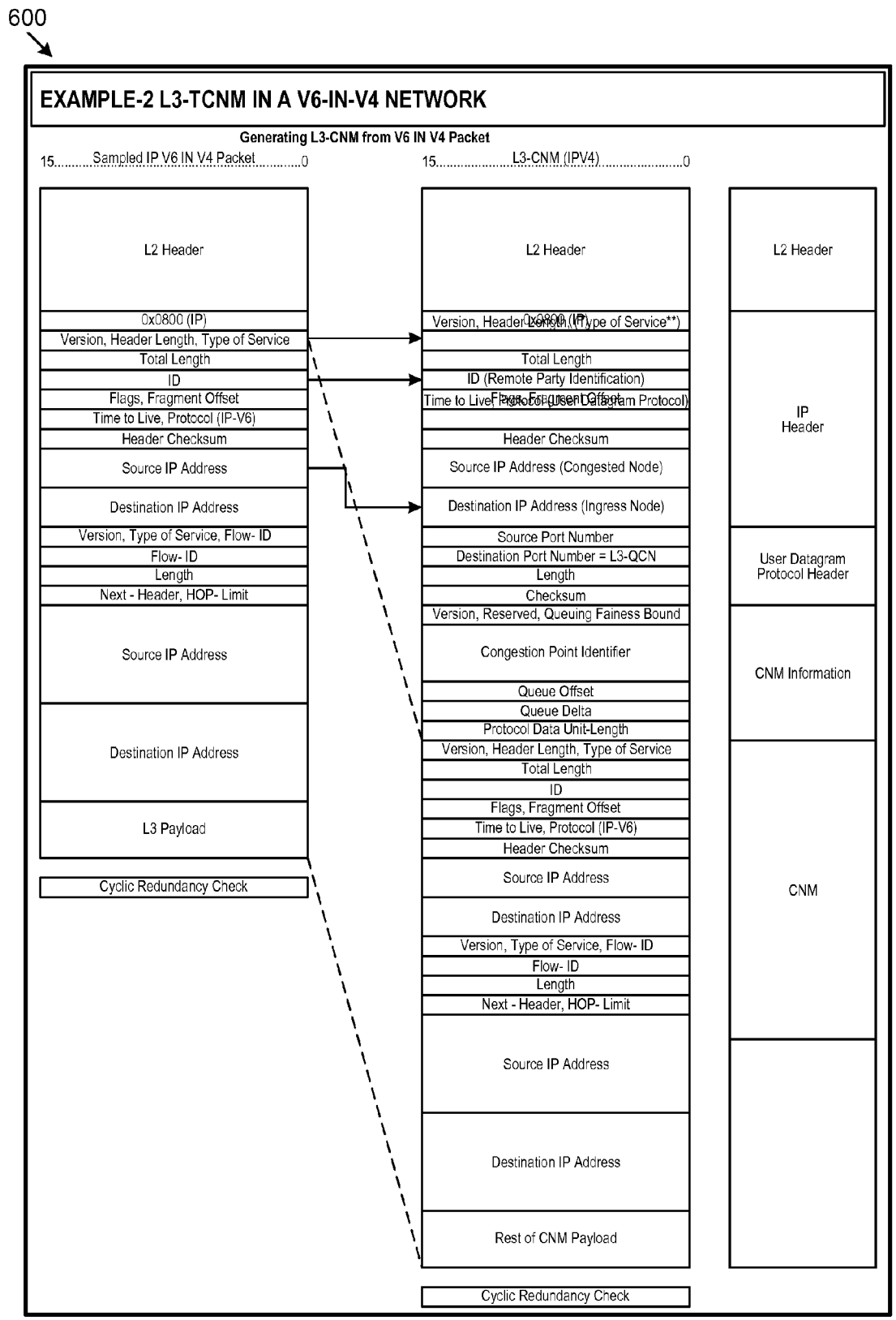
FIG. 7 shows an example generation of an IPv4 L3 CNM from an IP version 6 (IPv6) packet sampled in IPv4.

FIG. 7 shows an example generation 600 of an IPv4 L3 CNM from an IP version 6 (IPv6) packet sampled in IPv4.

Figure 8:
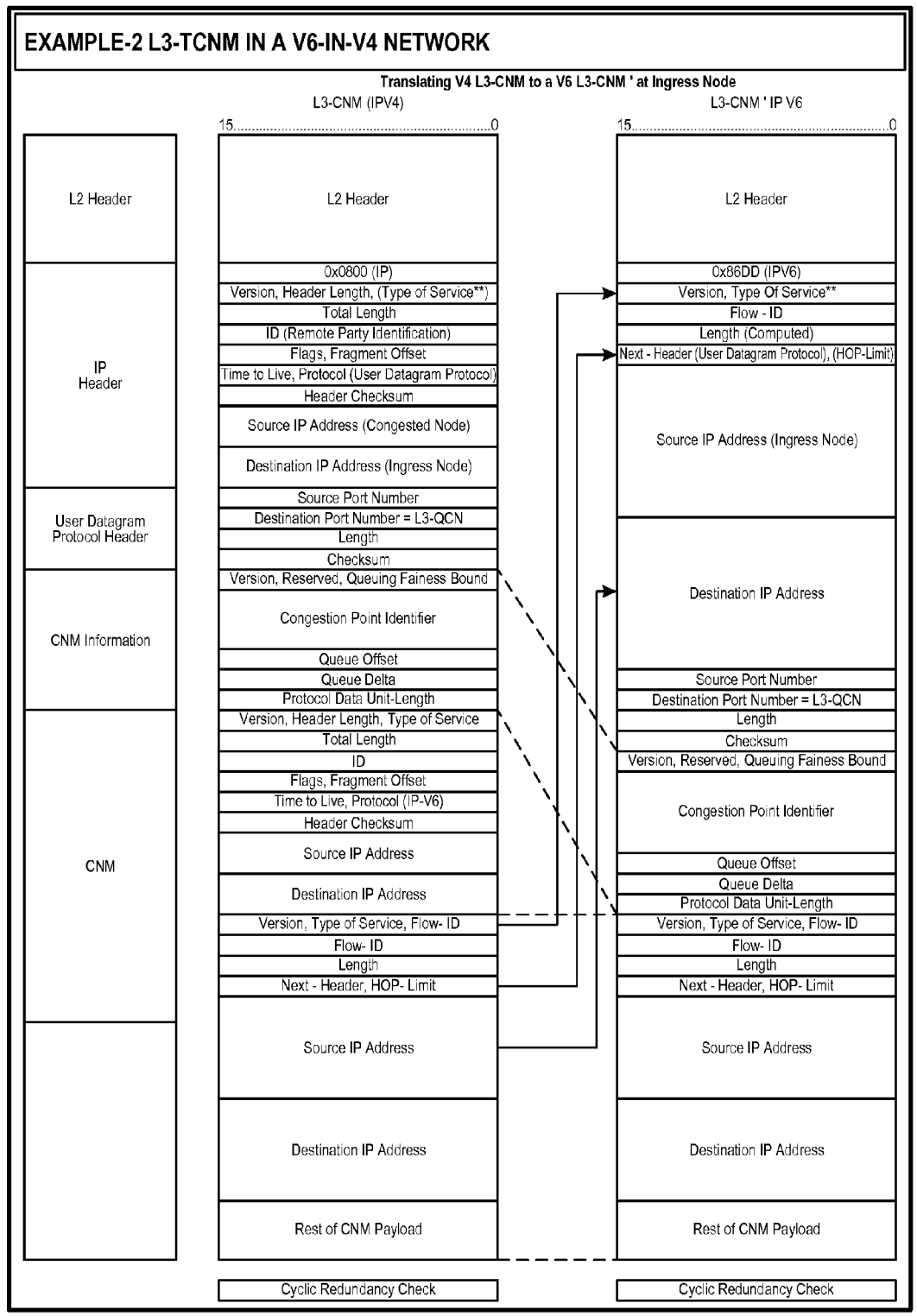
FIG. 8 shows a translation of an IPv4 L3 CNM to an IPv6 L3 CNM.

FIG. 8 shows a translation 650 of an IPv4 L3 CNM to an IPv6 L3 CNM.

Figure 9:
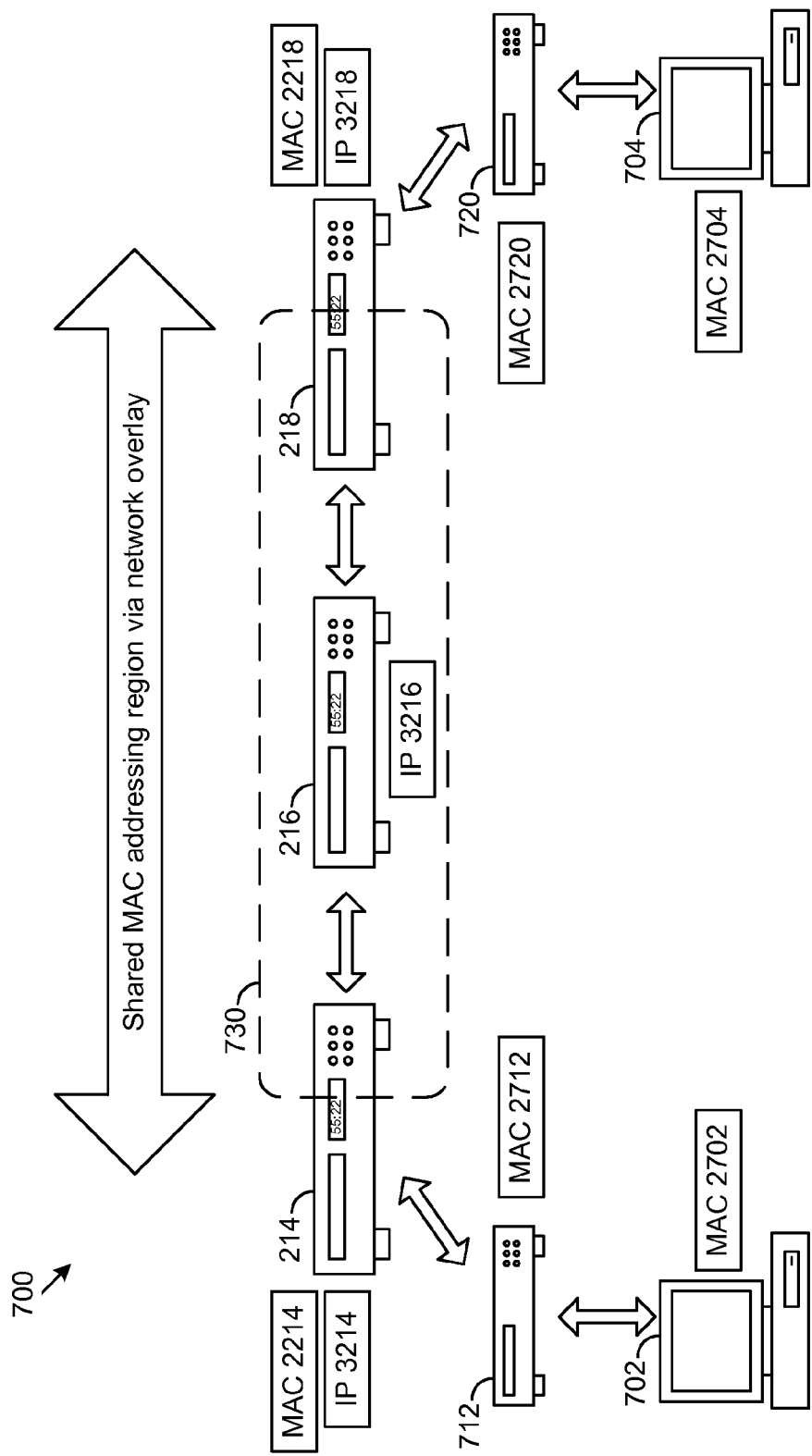
FIG. 9 shows an example network environment.

FIG. 9 shows an example network environment 700. In the example network environment 700, a source host 702 may send communications to a destination host 704. The communications may traverse routers 214, 216, 218, and bridges 712 and 720. Router 214 may be the ingress node to network overlay 730, and router 218 may be the egress node of network overlay 730. Network overlay 730 may traverse router 216. In various implementations, network overlay 730 may include a tunnel such as a virtual extensible local area network (VXLAN) tunnel. In some cases overlay 730 may extend a network area. For example an L2 MAC addressing region may be extended by overlay 730. Routers 214, 216, and 218 may forward communications using an IP-addressing in a L3 network system. Router 214 and 218 and bridges 712 and 720 may forward communications based on MAC addressing. For example, hosts 702, 704, bridges 712, 720, and routers 214, 218 may be included in a single L2 addressing region extended by overlay 730. The hosts 702 and 704 may respectively have MAC-addresses 2702 and 2704. Routers 214, 216, and 218 may have IP-addresses 3214, 3216, and 3218, respectively. Routers 214 and 218 may have MAC-addresses 2214 and 2218, respectively. Bridges 712 and 720 may have MAC-addresses 2712 and 2720, respectively.

In some cases, a communication originating from source host 702 may trigger a congestion management message at one or more of the routers 214, 216, 218 or bridges 712, 720 as the communication is routed to destination host 704. Routers and bridges 712, 214, 218, and 720 may be within the same addressing region as the source host. Communications from the source host within this addressing region may include the source host MAC-address 2702 as the MAC source address (MAC-SA) of the communication. Congestion management messages, such as CNMs, triggered at routers and bridges 712, 214, 218 and/or 720 may place the source host MAC 2702 from the MAC-SA of the communication into the destination address of the triggered congestion management message and the congestion management message may be forwarded back to the source host 702.

At router 216 and at 218 (if the triggering occurs without first egress processing the communication from the network overlay 730), communications from source host 2702 may include the IP address 3214 of the ingress node, router 214. In some cases, a communication originating from source host 702 may trigger a congestion management message that is directed to router 214 at IP address 3214. In some cases, it may be advantageous for triggered congestion management message to be forwarded back to the host that originated the triggering communication—in this example, source host 702.

In various implementations, router 214 may translate a congestion management message with IP 3214 listed as the source IP into a congestion management message with MAC 2702 listed as the MAC-SA. For example, if a L3 CNM is triggered at routers 216 and/or 218 by a communication from the source host 702, the L3 CNM may be forwarded to router 214 at IP 3214. Router 214 may translate the L3 CNM addressed to IP 3214 into a different L2 CNM addressed to MAC 2702. For example, the router 214 may apply translation circuitry 300 to translate the congestion management message.

Figure 10:
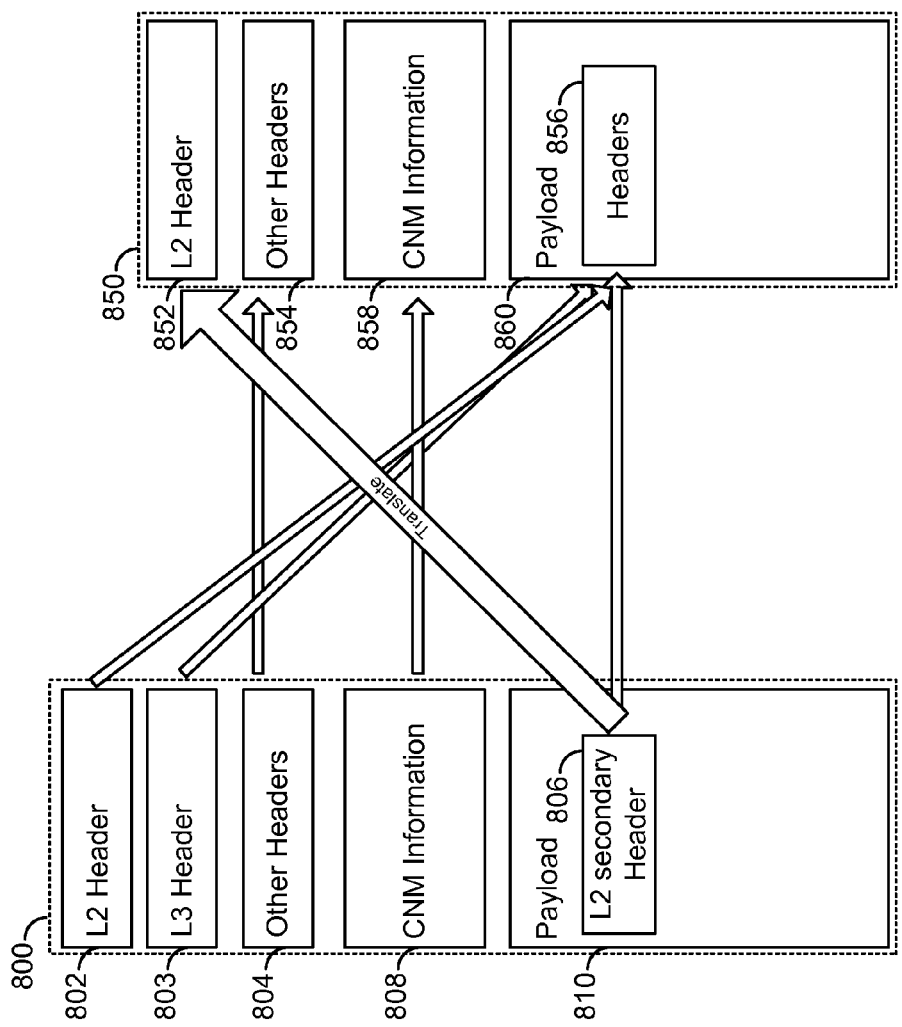
FIG. 10 shows an example translation from an L3 CNM to a translated Level 2 (L2) CNM.

In an example, the network overlay 730 may include a VXLAN tunnel extending a L2 network. The translation circuitry 300 may translate a L3 CNM into a translated L2 CNM for forwarding into the L2 network beyond the ingress node of the VXLAN tunnel. FIG. 10 shows an example translation from an L3 CNM 800 to a translated L2 CNM 850. The L2 secondary header 806 with the MAC-SA of the source host is translated into the main L2 header 852 of the translated L2 CNM. The main L2 header 802 of the original L3 CNM may be dropped or added to the payload 860 of the translated L2 CNM. Similarly, the main L3 header 803 of the original L3 CNM may be dumped or added to the translated payload 860. Other header fields 804, for example, L3 headers and/or other headers, from the original L3 CNM 800 may be translated into header fields 854 on the translated L2 CNM 850. The payload 810 of the original L3 CNM may be translated to the payload 860 of the translated L2 CNM. The CNM information 808 of the original L3 CNM may be translated to the CNM information 858 of the translated L2 CNM.

Figure 11:
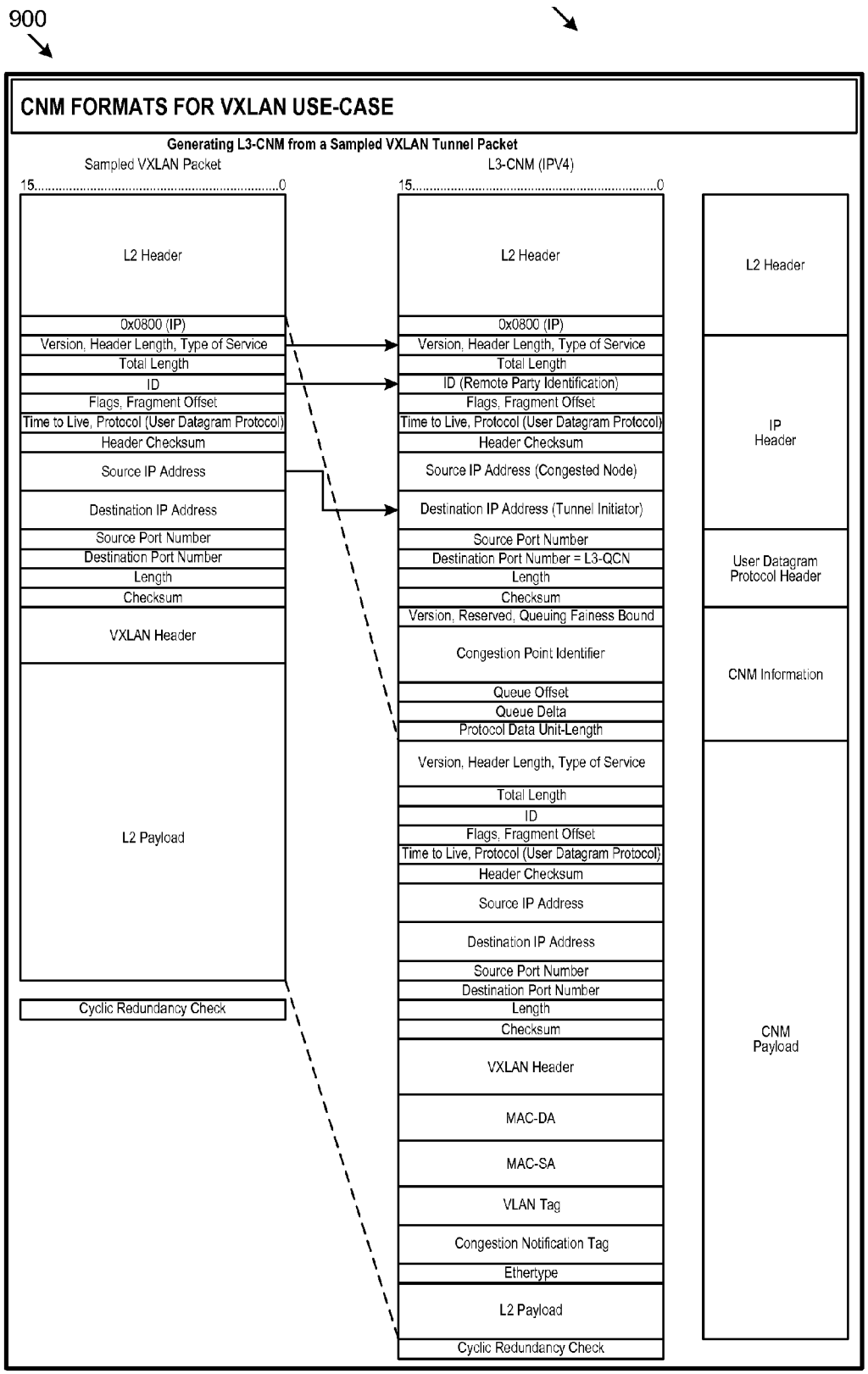
FIG. 11 shows an example generation of an IPv4 L3 CNM from a virtual extensible local area network (VXLAN) tunnel packet.

FIG. 11 shows an example generation 900 of an IPv4 L3 CNM from a VXLAN tunnel packet.

Figure 12:
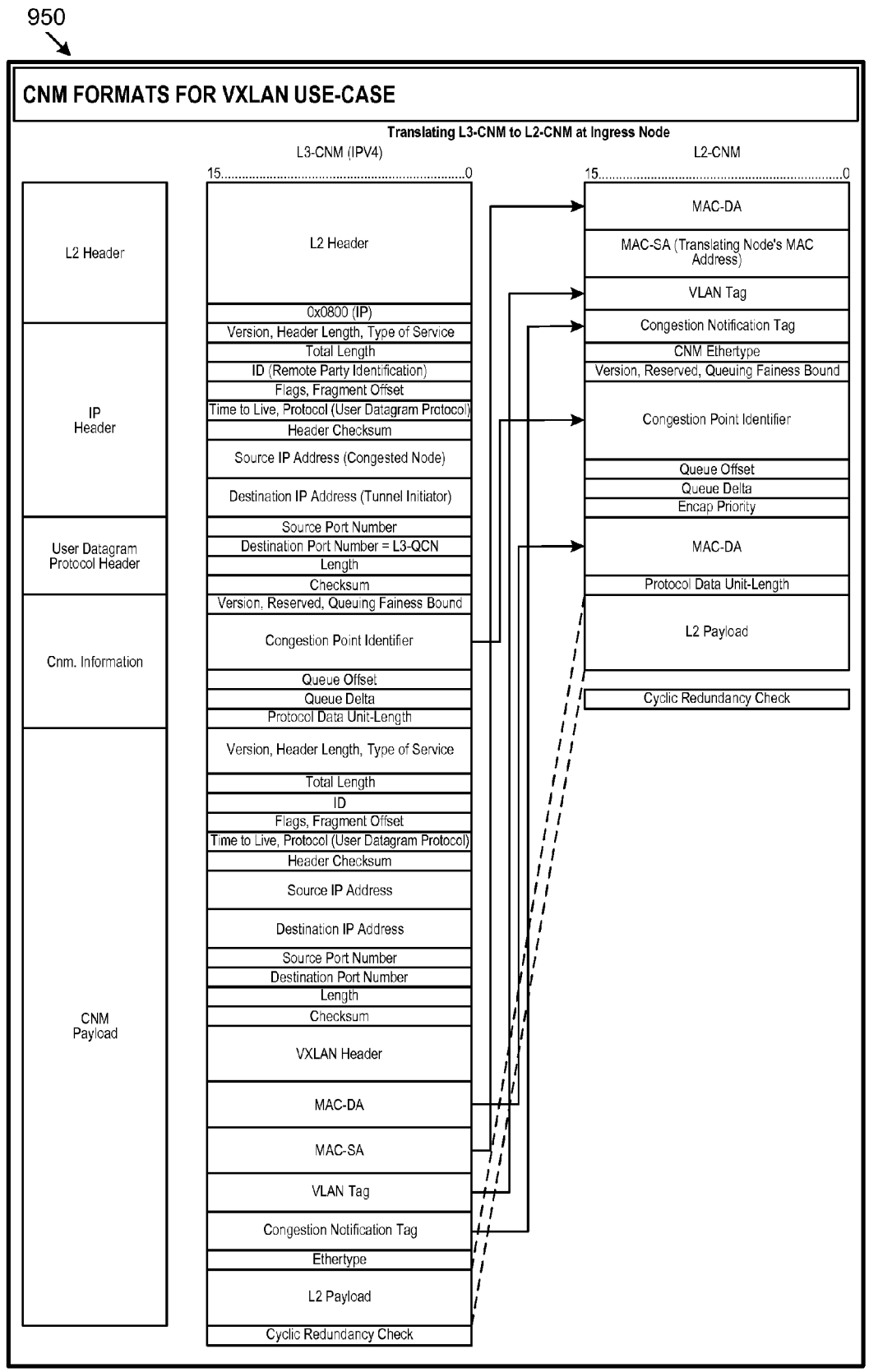
FIG. 12 shows an example translation of an L3 CNM to an L2 CNM.

FIG. 12 shows an example translation 950 of an L3 CNM to an L2 CNM.

Figure 13:
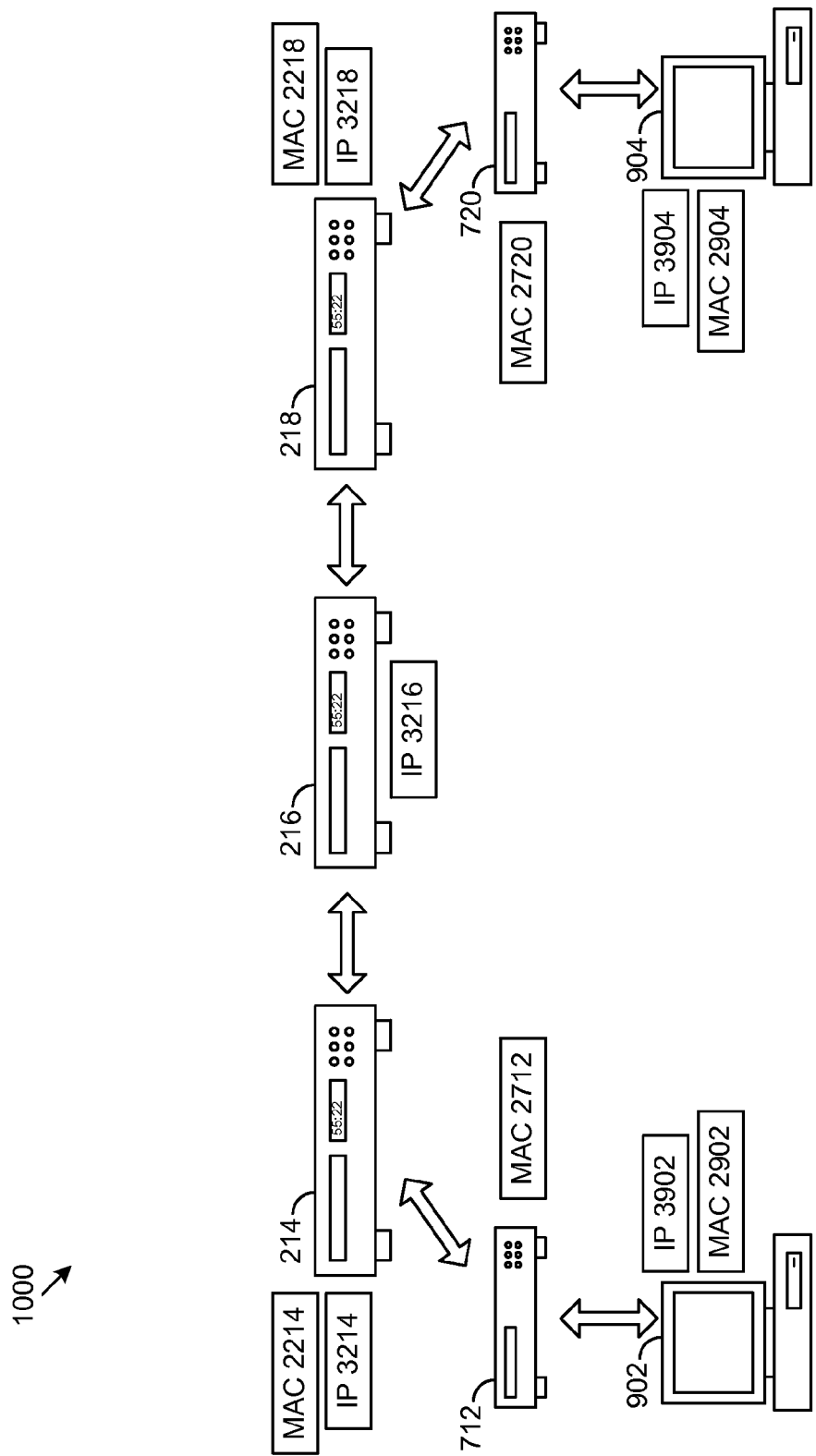
FIG. 13 shows an example network environment.

FIG. 13 shows an example network environment 1000. In the example network environment 1000, a source host 902 may send communications to a destination host 904. The communications may traverse routers 214, 216, 218, and bridges 712 and 720. Routers 214, 216, and 218 and hosts 902 and 904 may forward communications using an IP-addressing in a L3 network system. Routers 214 and 218, bridges 712 and 720, and hosts 902 and 904 may forward communications based on MAC addressing. For example host 902, bridge 712, and router 214 may form a first L2 MAC addressing region, hosts 902, 904 and routers 214, 216, and 218 may form a L3 IP addressing region; and host 904, bridge 720, and router 718 may form a second L2 MAC addressing region. The hosts 902 and 904 may respectively have MAC-addresses 2902 and 2904 and IP addresses 3902 and 3904. Routers 214, 216, and 218 may have IP-addresses 3214, 3216, and 3218, respectively. Routers 214 and 218 may have MAC-addresses 2214 and 2218, respectively. Bridges 712 and 720 may have MAC-addresses 2712 and 2720, respectively.

In some cases, a communication originating from source host 902 may trigger a congestion management message at one or more of the routers 214, 216, 218 or bridges 712, 720 as the communication is routed to destination host 904. Routers 214 and bridge 712 may be within the same L2 addressing region as the source host. Communications from the source host within this addressing region may include the source host MAC-address 2902 as the MAC source address (MAC-SA) of the communication. Congestion management messages, such as CNMs, triggered at router 214 and/or bridge 712 may place the source host IP 2902 from the MAC-SA of the communication into the destination address of the triggered congestion management message and the congestion management message may be forwarded back to the source host 902. Routers 214, 216, and 218 may be within the same L3 addressing region as the source host. Communications from the source host within this addressing region may include the source host IP address 3902 as the source IP of the communication. Congestion management messages, such as CNMs, triggered at routers 214, 216, and/or 218 may place the source host IP 3902 from the source IP of the communication into the destination address of the triggered congestion management message and the congestion management message may be forwarded back to the source host 902.

At bridge 720 communications from source host 2902 may be include the MAC address of router 218 in the MAC-SA field. In some cases, a communication originating from source host 902 may trigger a congestion management message at bridge 720 that is directed to router 218 at MAC address 2218. In some cases, it may be advantageous for triggered congestion management message to be forwarded back to the host that originated the triggering communication—in this example, source host 902.

In various implementations, router 218 may translate a congestion management message with MAC 2218 listed as the MAC-SA into a congestion management message with IP 3902 listed as the source IP. For example, if a L2 CNM is triggered at bridge 720 by a communication from the source host 902, the L3 CNM may be forwarded to router 218 at MAC 2218. Router 218 may translate the L2 CNM addressed to MAC 2218 into a different L3 CNM addressed to IP 3902. For example, the router 218 may apply translation circuitry 300 to translate the congestion management message.

Figure 14:
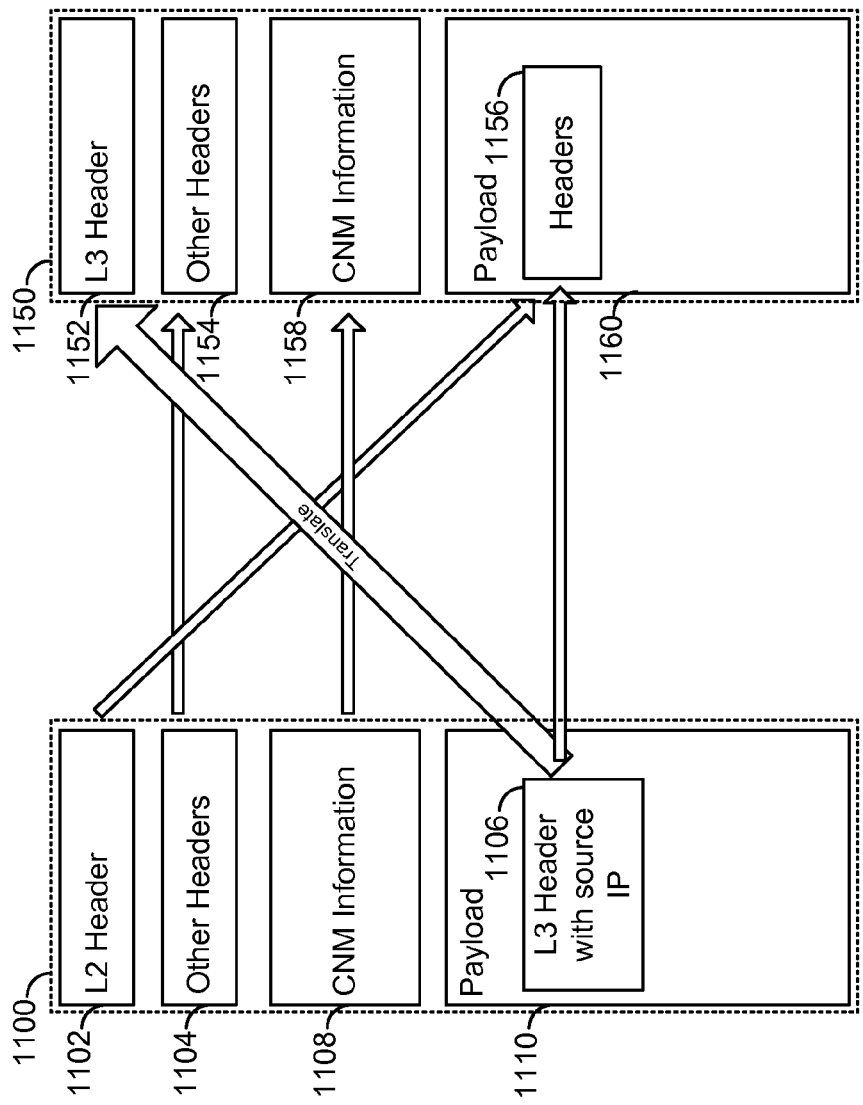
FIG. 14 shows an example translation from an L2 CNM to a translated L3 CNM.

FIG. 14 shows an example translation from an L2 CNM 1100 to a translated L3 CNM 1150. The L3 IP header 1106 with the source IP is translated into the L3 main IP header 1152 of the translated L3 CNM. The L2 main MAC header 1102 of the original L2 CNM may be dropped or added to the payload 1160 of the translated L3 CNM. Additionally or alternatively, the L3 IP header 1106 with the source IP from the original L2 CNM may contribute to payload header fields 1156 on the translated L3 CNM. The payload 1110 of the original L2 CNM may be translated to the payload 1160 of the translated L3 CNM. The CNM information 1108 of the original L2 CNM may be translated to the CNM information 1158 of the translated L2 CNM.

Figure 15:
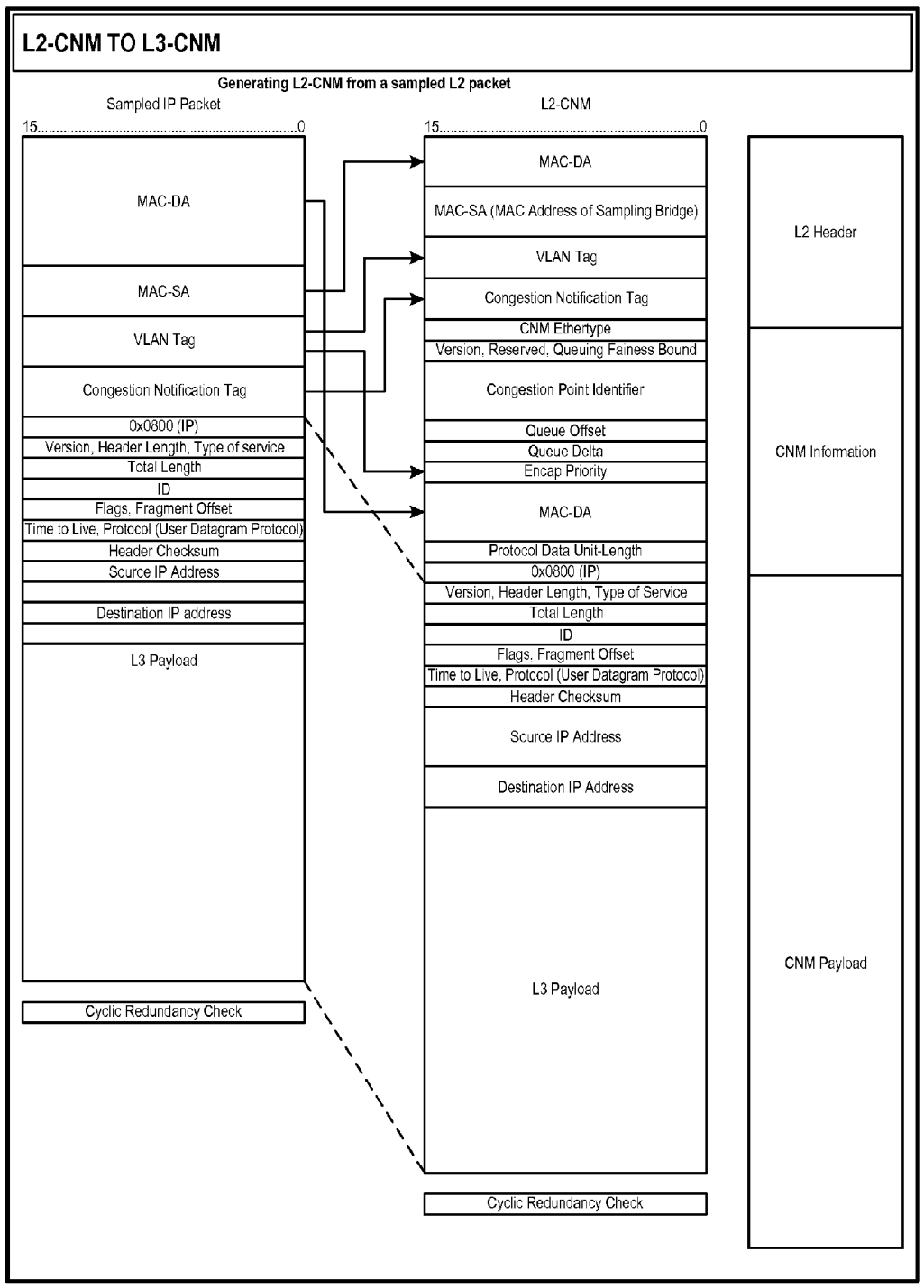
FIG. 15 shows an example generation of an L2 CNM from a sampled L2 packet.

FIG. 15 shows an example generation 1200 of an L2 CNM from a sampled L2 packet.

Figure 16:
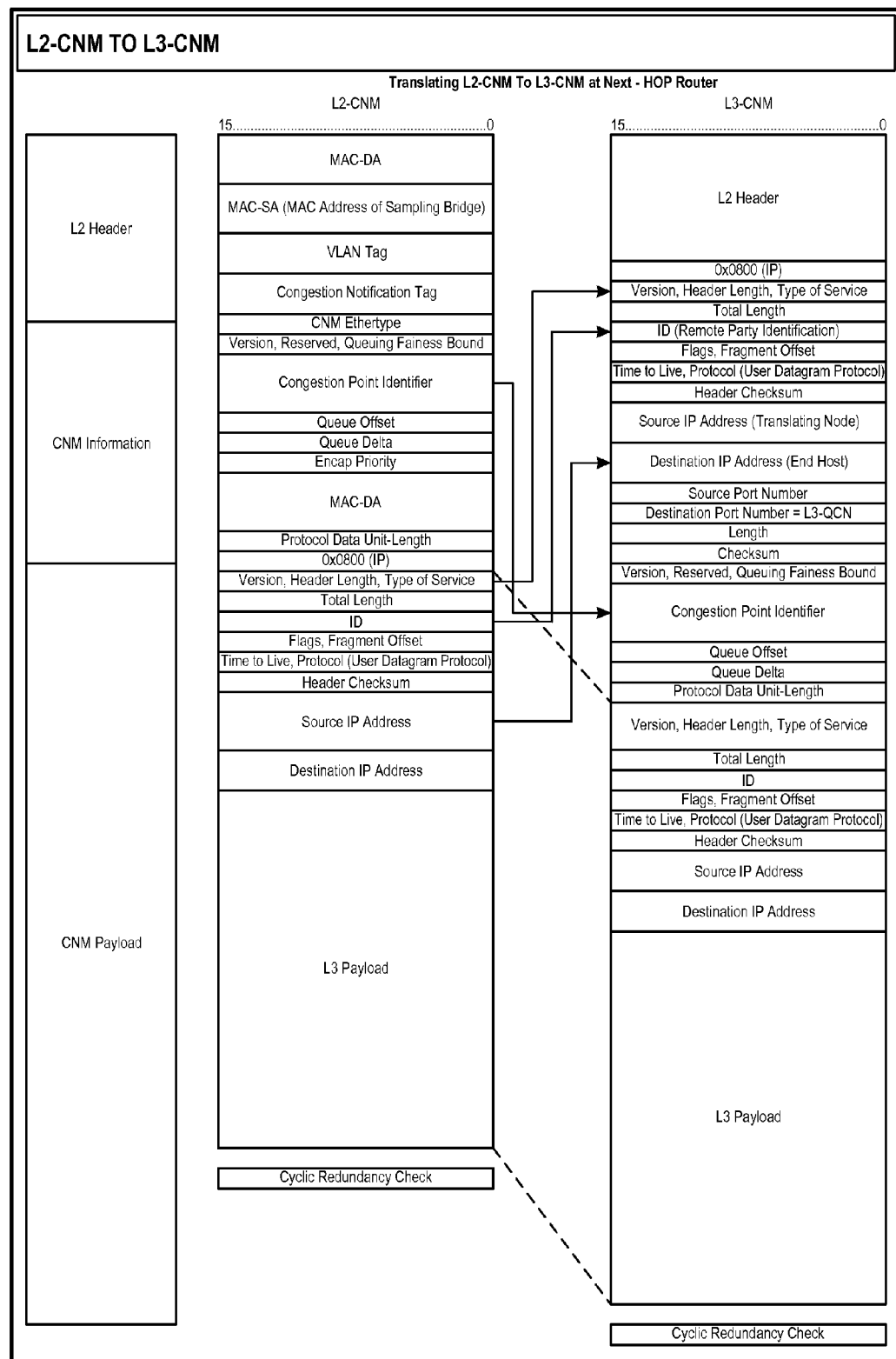
FIG. 16 shows an example translation of an L2 CNM to an L3 CNM.

FIG. 16 shows an example translation 1250 of an L2 CNM to an L3 CNM.

Figure 17:
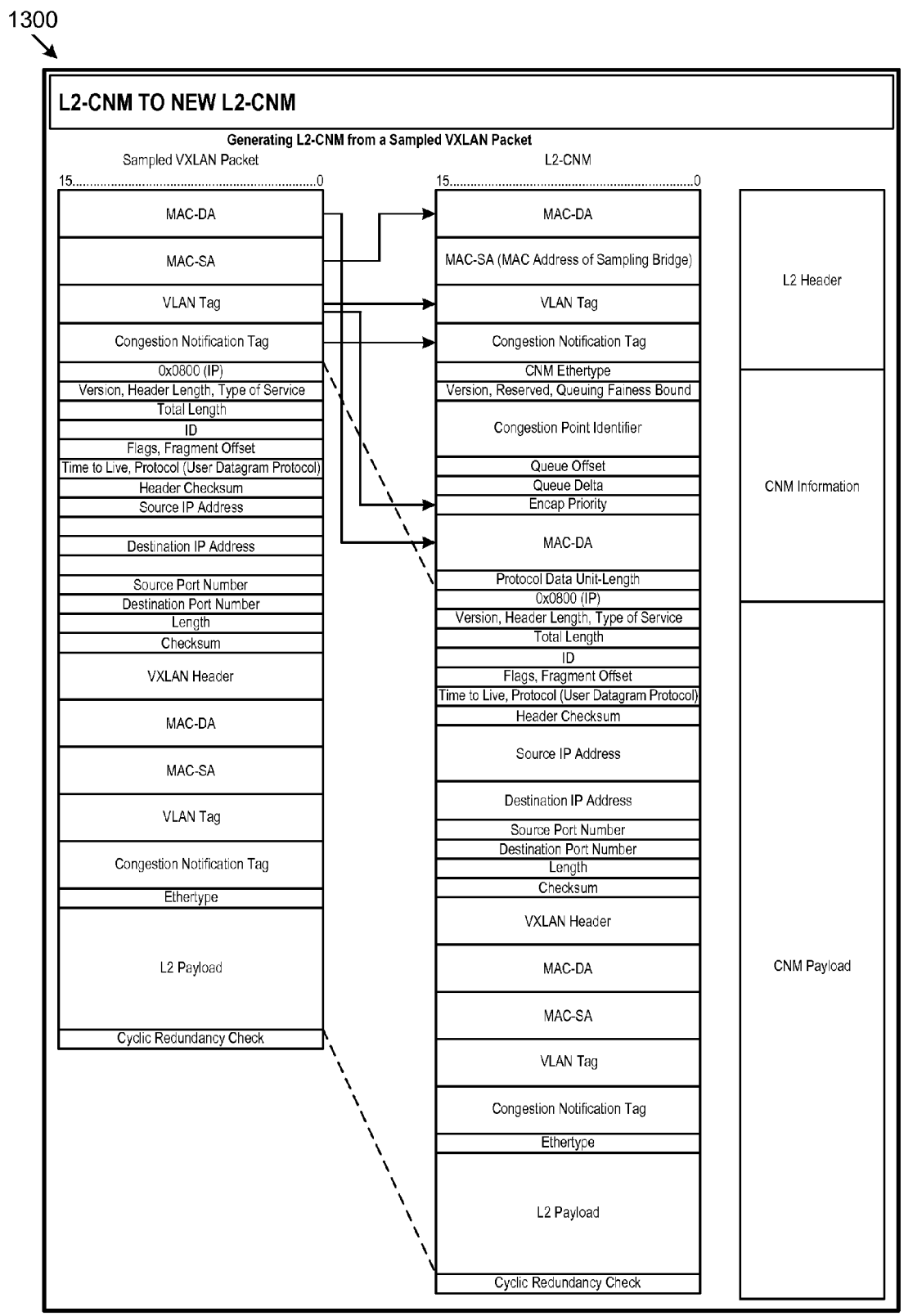
FIG. 17 shows an example generation of an L2 CNM from a sampled VXLAN packet.

FIG. 17 shows an example generation 1300 of an 1200 L2 CNM from a sampled VXLAN packet.

Figure 18:
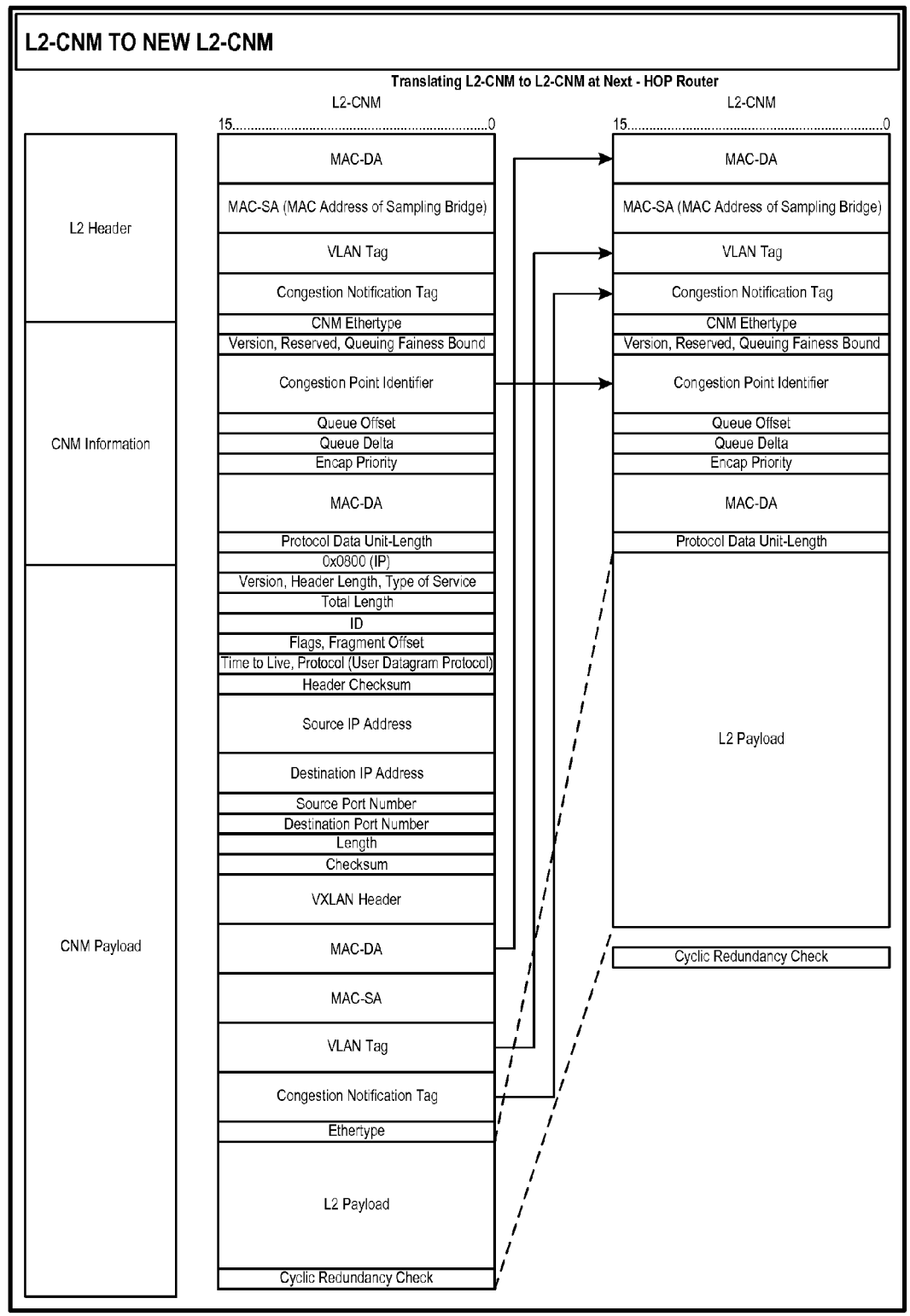
FIG. 18 shows a translation of an L2 CNM to an L2 CNM.

FIG. 18 shows a translation 1350 of an L2 CNM to an L2 CNM.

Additionally or alternatively, combinations of the above described congestion management message translation techniques and architectures may be used to support a single congestion management domain across any combination of L2 networks, L3 networks and network overlays. For example, a data center or enterprise network including L2 and L3 networking regions may be handled using a single congestion management domain.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:
1. A method, comprising:
receiving a first management message at translation circuitry of a node;

determining, at the translation circuitry, that the first management message was triggered by a locally originating communication by determining that a first address in a first header of the first management message comprises a local address from an overlay network including the node;
responsive to determining that the first management message was triggered by a locally originating communication, reading a payload of the first management message to determine a source host of the locally originating communication; and
facilitating extension of quantized congestion notification support across the overlay network by:
translating, via the translation circuitry, the first management message into a second management message by moving a second address from the payload to a second header of the second management message, the second address associated with the source host; and
sending the second management message to the source host.

2. The method of claim 1, wherein the first address is associated with the node.

3. The method of claim 1, wherein:
the first and second addresses comprise an identical address type; and
the first and second management messages comprise an identical management message type.

4. The method of claim 3, wherein the first and second addresses comprise internet protocol (IP) addresses.

5. The method of claim 1, wherein translating the first management message into the second management message comprises replacing a first level 3 (L3) header with a second L3 header, the second L3 header being derived from the payload.

6. The method of claim 1, wherein the first address comprises a first address type and the second address comprises a second address type different from the first address type.

7. The method of claim 6, wherein the first address type is associated with a first addressing scheme and the second address type is associated with a second addressing scheme.

8. The method of claim 6, wherein the first address type comprises an IP address and the second address type comprises a media access control (MAC) address.

9. The method of claim 6, wherein the first address type comprises a MAC address and the second address type comprises an IP address.

10. The method of claim 1, wherein translating the first management message into the second management message comprises replacing a L3 management message with a level 2 (L2) management message.

11. The method of claim 1, wherein translating the first management message into the second management message comprises replacing a L2 management message with a L3 management message.

12. A device, comprising:
a network interface circuit configured to receive a first management message; and
translation circuitry in data communication with the network interface circuit, the translation circuitry configured to:
determine that the first management message was triggered by a locally originating communication by a determination that a first address in a first header of the first management message comprises a local address from an overlay network including the device;
responsive to the determination that the first management message was triggered by the locally originating communication, read a payload of the first management message to determine the source host for the communication; and
facilitate extension of quantized congestion notification support across the overlay network by:
translating the first management message into a second management message comprising a second header by moving a second address from the payload to a second header of the second management message, the second address associated with the source host and
sending, via the network interface circuit, the second management message to the source host.

13. The device of claim 12, wherein the first address comprises a first address type and the second address comprises a second address type different from the first address type.

14. The device of claim 13, wherein the first address type is associated with a first addressing scheme and the second address type is associated with a second addressing scheme.

15. The device of claim 12, wherein:
the first and second addresses comprise an identical address type; and
the first and second management messages comprise an identical management message type.

16. The device of claim 12, wherein the payload comprises a header field comprising the address of the source host.

17. A product, comprising:
a computer-readable medium other than a transitory signal; and
instructions stored on the medium, the instructions configured to, when executed by circuitry, cause the circuitry to:
receive a first management message;
determine that the first management message was triggered by a locally originating communication by a determination that a first address in a first header of the first management message comprises a local address from an overlay network including the circuitry;
responsive to determining that the first management message was triggered by a locally originating communication, read a payload of the first management message to determine a source host for the communication; and
facilitate extension of quantized congestion notification support across the overlay network by:
translating the first management message into a second management message comprising a second header by moving a second address from the payload to a second header of the second management message, the second address associated with the source host; and
sending the second management message to the source host.

18. The product of claim 17, wherein:
the first and second addresses comprise an identical address type; and
the first and second management messages comprise an identical management message type.

19. The product of claim 17, wherein the instructions are further configured to, when executed, cause the circuitry to translate the first management message from a first type into a second type.

20. The product of claim 17, wherein the instructions are further configured to, when executed, cause the circuitry to translate the first management message into the second management message by replacing a first level 3 (L3) header with a second L3 header, the second L3 header being derived from the payload.

* * * * *